J. T. RYAN.
TIRE PROTECTOR.
APPLICATION FILED MAR. 13, 1908. RENEWED SEPT. 19, 1911.
1,063,290.
Patented June 3, 1913.
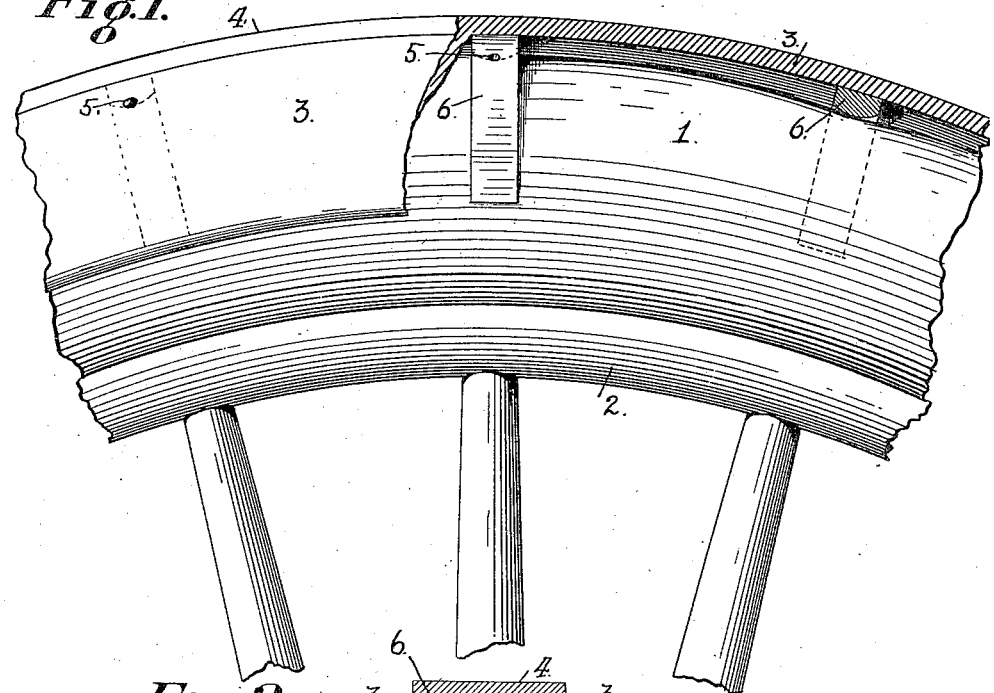
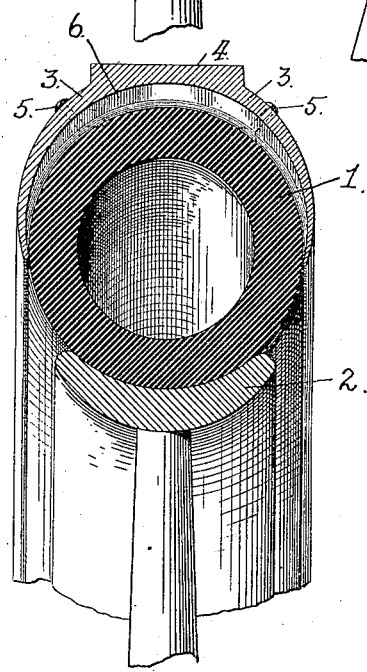

UNITED STATES PATENT OFFICE.

JOHN T. RYAN, OF VALLEJO, CALIFORNIA, ASSIGNOR TO AMERICAN TIRE ARMOR COMPANY, OF PHOENIX, ARIZONA, A CORPORATION OF ARIZONA.

TIRE-PROTECTOR.

1,063,290. Specification of Letters Patent. Patented June 3, 1913.

Application filed March 13, 1908, Serial No. 420,905. Renewed September 19, 1911. Serial No. 650,255.

*To all whom it may concern:*

Be it known that I, JOHN T. RYAN, a citizen of the United States, residing at Vallejo, in the county of Solano and State of California, have invented certain new and useful Improvements in Tire-Protectors, of which the following is a specification.

My invention relates to that class of shields or armor for pneumatic tires, in which a non-puncturable metallic covering is applied to that portion of the tire which is exposed to puncturing causes and dangers.

The problem here presented is not a simple one, for, though it may be quite evident that a metallic or other non-penetrable covering for the pneumatic tire will prevent such difficulties as puncturing, blow-outs and wear, it must also be borne in mind that the reason for the use of a pneumatic tire, namely, its cushion effect, must not be impaired.

It is the object of my invention, therefore, to construct, adapt and apply to a pneumatic tire, a simple, effective and easily fitted protector, which will still preserve, and even enhance the cushion effect or resiliency of the tire.

To this end my invention consists in the novel tire-protector which I shall now fully describe by reference to the accompanying drawings in which—

Figure 1 is a side view, partly broken, and in section, of my protector, showing its application to the tire. Fig. 2 is a cross-section of the same.

1 is the pneumatic tire, which, for the sake of simplicity and illustration, I here show as a single tube tire, though it is to be understood that my protector is equally applicable to the outer casing of a double tube tire. I have also shown the tire 1 as resting in the wheel rim 2, without attempting to show means for securing it, as these form no part of my invention.

3 is a non-puncturable shield, preferably, a metallic one, which fits over the tire 1 throughout its circumference and covers as much of its cross section as is necessary, both to protect the danger area of the tire, and to be itself held on by the inflation of said tire. This shield is a single piece, and may be provided with a defined tread portion, as shown at 4, though this is not essential.

The inner surface of the shield 3 does not directly or immediately, under normal conditions, bear upon the tire, but said shield is either formed with or has secured to it, by rivets 5, as here shown, any suitable number of transverse bearing strips 6 separated from each other by appreciable intervals, and disposed on and projecting from the inner surface of the shield, with a thickness, greatest at the median plane and thence diminishing to each end. These strips 6 bear upon and are forced into the tire, and with the tire and shield form normally vacant spaces between them into which the tire may expand, thereby preserving and even increasing its resiliency, thus yielding all of the advantages to be derived from a pneumatic cushion.

Having thus described my invention, what I claim as new and desire to secure by Letters Patent is:—

1. In an armor for pneumatic tires, a rigid arch shaped shield adapted to surround the tire, the sides of said shield being adapted to lie in close proximity to the sides of the tire when the shield is in position thereon, and a plurality of crescent shaped strips carried by the shield and projecting inwardly therefrom, said strips being adapted to engage the outer portion of the tire and being of a thickness to form, when the shield is in normal position on an inflated tire normally vacant spaces between the outer surface of the tire and the shield into which the tire may expand under distorting pressure.

2. The combination with a rim, of a pneumatic tire thereon, a rigid arch shaped shield for the tire having an inside diameter sufficiently greater than the extreme diameter of the tire when inflated to form at all points between the shield and tire a space in which portions of the tire can project when under load pressure, said casing having depending sides adapted to lie in close proximity to the sides of the tire below the center thereof, and a series of spaced cross members interposed between the shield and tire and rigidly secured to one of said members, said cross members diminishing in thickness toward the ends thereof, and extending down the sides of the shield, the thickness of said cross pieces being such that they engage the outer surface of the tire, and the inner surface of the shield and bridge the space between the tire and shield.

In testimony whereof I have signed my name to this specification in the presence of two subscribing witnesses.

JOHN T. RYAN.

Witnesses:
 WM. F. BOOTH,
 D. B. RICHARDS.

---

Copies of this patent may be obtained for five cents each, by addressing the "Commissioner of Patents, Washington, D. C."